UNITED STATES PATENT OFFICE.

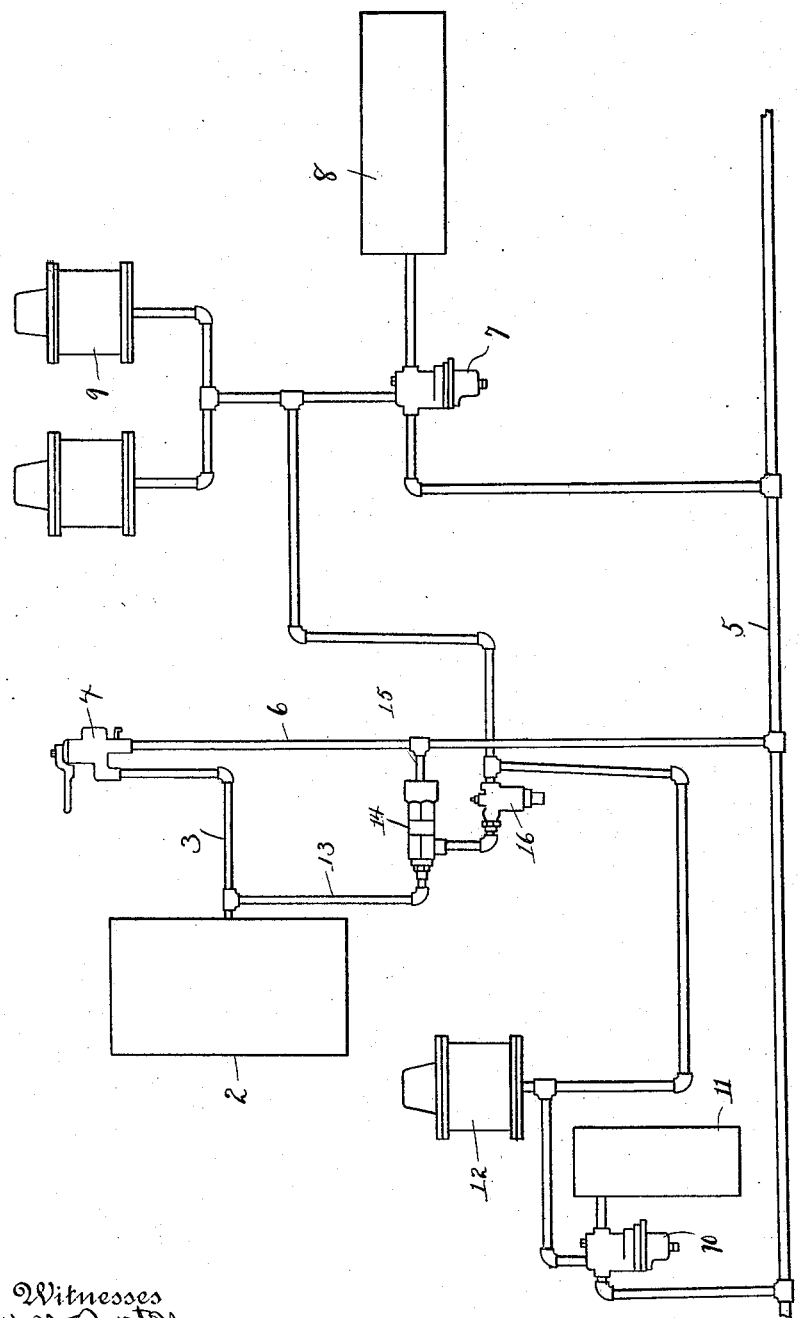

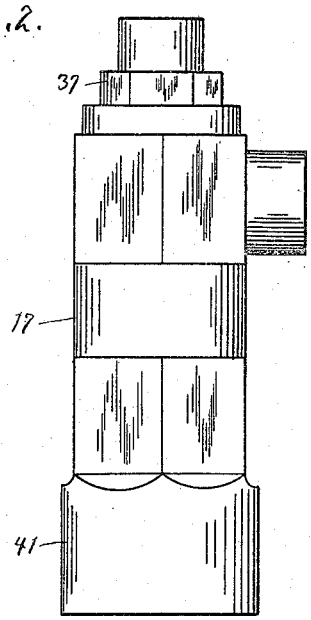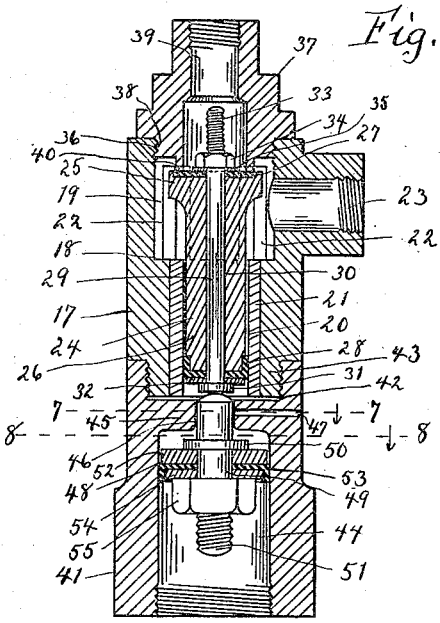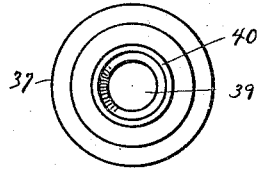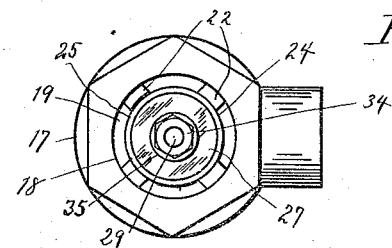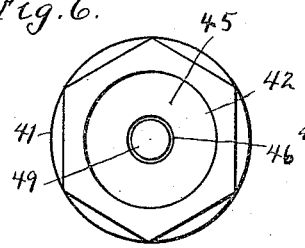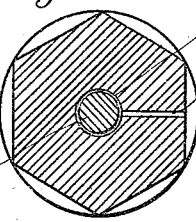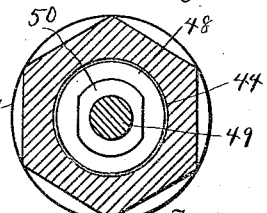

JAMES G. SMELTZER, OF GERMANTOWN, PENNSYLVANIA.

AIR-BRAKE.

1,277,143.　　　　　Specification of Letters Patent.　　Patented Aug. 27, 1918.

Application filed May 12, 1916. Serial No. 97,041.

*To all whom it may concern:*

Be it known that I, JAMES G. SMELTZER, a citizen of the United States, residing at Germantown, in the county of Philadelphia and State of Pennsylvania, have invented new and useful Improvements in Air-Brakes, of which the following is a specification.

My invention relates to new and useful improvements in air brakes, and has for its object to provide an exceedingly simple and effective device of this character, whereby the brakes and more particularly those of the engine and tender will be automatically applied or operated should the pressure in the train pipe or train line pass below a predetermined point and to prevent the brakes from being released unless desired by the engineer after they have been applied by the ordinary service or emergency application.

A further object of the invention is to provide in combination with any ordinary and well known air brake system a safety application valve which will be actuated by the air pressures in the different pipes connected therewith, whereby the pressure in the main reservoir may be directly utilized in supplying the desired pressure to the brake cylinders for applying or maintaining the application of the brakes should the pressure in the brake cylinders leak away after they have been once applied and the train pipe pressure reduced below a predetermined pressure or a pressure necessary for holding the brakes in their applied positions.

Another object of the invention is to provide a safety application valve of unique construction which may be readily and quickly applied to any air brake system in use, said safety application valve being located between and communicating with the train pipe, the main reservoir and the brake cylinders, whereby an application of the brakes may be made without the use of the auxiliary reservoir should the same become imperative, since the air pressure may be applied to the brake cylinders directly from the main reservoir.

A still further object of the invention is to provide means in an air brake system whereby the engineer's brake valve must positively be placed in the release position to permit the release of the air from the brake cylinders before the engine can be moved and to permit the application of the brakes, even though the engineer's brake valve has not been in the release position a sufficient length of time to permit the full charging of the auxiliary reservoirs.

With these ends in view, my invention consists in the details of construction and combination of elements hereinafter set forth and then specifically designated by the claims.

In order that those skilled in the art to which this invention appertains, may understand how to make and use the same, I will describe its construction in detail, referring by numeral to the accompanying drawings forming a part of this application, in which—

Figure 1, is a diagrammatical view of a section of an air brake system embodying my improvement.

Fig. 2, is an enlarged side elevation of my improved safety application valve.

Fig. 3, is a longitudinal sectional view thereof.

Fig. 4, is an inner end view of the cylinder cap, showing the integral valve seat.

Fig. 5, is an end view of the safety application valve with the cylinder cap removed.

Fig. 6, is an end view of the equalizing pressure piston casing.

Fig. 7, is a section at the line 7—7 of Fig. 3, looking in the direction of the arrow; and Fig. 8, is a section at the line 8—8 of Fig. 3, looking in the direction of the arrow.

In carrying out my invention as here embodied 2 represents the main reservoir having connection by means of a pipe 3 with the engineer's brake valve 4, the latter being connected with the train line or train pipe 5, the train line branch 6 in this case forming a part of the train line 5. The train line is connected with the triple valve 7, and said triple valve is connected by suitable connections or pipes with the auxiliary reservoir 8 and the brake cylinders 9, the latter here being illustrated as the engine brake cylinders. The train line may also be connected with any number of triple valves, and another is shown designated by the reference numeral 10, and here illustrated as representing the one upon the tender, this latter being connected by suitable connections or pipes with an auxiliary reservoir 11, and a brake cylinder 12. The main reservoir 2 is connected in any suitable manner as through a pipe 13 with the cap end of my improved safety application valve 14. The equalizing pressure piston casing of said valve is connected in any suitable manner as by a pipe 15 with the train line 5 as through its branch 6. The third opening leading from the safety application valve is connected with the brake cylinders 9 and 12 by means of suitable pipes, branches and connections, and in this pipe line is situated an automatic pressure reducing valve 16 of any well known construction which regulates or controls the air pressure passing from the main reservoir to the brake cylinders and auxiliary reservoirs and such valve is generally set at fifty pounds, so that the air issuing from the valve is only of fifty pounds pressure regardless of any higher degree of air pressure on the other side of the valve.

My improved safety application valve as illustrated in Figs. 2 to 8 inclusive consists of a body 17 having a central longitudinal bore 18 therethrough of two different diameters, thereby forming a valve chamber 19 and a plunger chamber 20, the latter being smaller than the former. The plunger chamber may, if found desirable, be provided with a sleeve or bushing 21, so that said sleeve or bushing may be of a different material than that of the body, and also permits the renewal of said bushing should the same become loose or worn.

The valve chamber 19 is provided with a number of longitudinal ribs 22 formed integral with the body, and from this valve chamber 19 leads a passage 23, whereby connection with the interior of the safety application valve or the valve chamber 19 thereof, is made with the pipes or connections leading to the brake cylinders.

In the body is mounted the piston or slide valve 24 comprising a valve head 25 and a stem 26, said valve head carrying a suitable compressible washer or disk 27 for engagement with the valve seat as will be hereinafter described.

On the opposite end of the piston or slide valve or on the end of the valve stem is mounted a cup washer 28 adapted to snugly fit the plunger chamber 20 or the bushing 21 mounted thereon, so as to form a plunger or packing to prevent the passage of air from the body through that end in which the valve stem operates.

The washers 27 and 28 may be mounted and held in position in any suitable manner, but I have here shown one means of mounting and holding said washers in position, which consists of passing a bolt or rod 29 through the longitudinal central bore 30 in the slide valve, said bolt or rod having a head 31 on one end for engagement with the cup washer 28, or a metallic washer 32 interposed between them, and having the other end threaded as at 33, on which is mounted a nut 34 for engagement with the washer 27, or a metallic washer 35 interposed between them.

The valve head is mounted between the ribs 22, and is guided thereby, said ribs spacing the valve head from the walls of the valve chamber 19, thereby forming passages around said valve head. The valve chamber end of the body is threaded as at 36, and by means of said threads the cylinder cap 37 which is also provided with threads 38 is mounted upon the body. This cylinder cap is provided with a central bore 39, whereby communication is formed with the valve chamber 19, and the inner end of said cylinder cap is provided with a valve seat 40 in the form of a flange projecting from the inner end of the cylinder cap and surrounding the central bore 39 of said cylinder cap. When the piston or slide valve is raised or moved in that direction toward the cylinder cap 37, the valve seat 40 is engaged by the valve head or the washer 27 carried thereby, so as to close the passageway 39 forming the communication between the main reservoir and the valve chamber 19, thus shutting off the supply of air from said main reservoir to the brake cylinders through the passageways 23.

On the opposite end of the body 17 is mounted the equalizing pressure piston casing 41 having a threaded bore 42 for registration with the threaded projection 43 of the body, and this casing is provided with an equalizing pressure piston bore or chamber 44 separated from the threaded bore 42 by an integral partition 45 having a central hole 46 therethrough, said hole having communication with the atmosphere by means of a duct 47. The duct 47 is provided to act as a signal so that the engineer will know should either of the cup washers 28 or 53 become displaced or worn sufficiently to permit a passage of air beyond them.

If the cup washer 28 does not properly pack the parts, air will pass from the port 39, then between the walls of the piston valve body and out of the duct, when the piston valve is open, and this will produce a whistling sound to indicate that the air is escaping and that a new washer is needed. If, when the piston valve is closed and the air pressure in the train line is beyond a predetermined point, air escapes through the duct 47. This is an indication that the cup washer 53 is out of order and needs replacing.

In the chamber 44 of the casing 41 is mounted the equalizing pressure piston 48 having a stem 49 which projects through the central hole 46 in the partition 45, whereby the inner end of said stem may engage the slide valve to actuate the same. This equalizing pressure piston may be constructed in any well known and desirable manner, but as here shown the stem 49 is provided with an integral flange or collar 50, and the outer end of said stem is threaded as at 51.

On the stem 49 is mounted a metallic washer 52 which engages the flange or collar 50, and against the outer face of this washer 52 rests the cup washer 53, the same being held in shape and in snug contact with the walls of the chamber 44 by means of a second smaller metallic washer 54 also mounted upon the stem 49, all of these parts being held in their proper place and the washer 53 being held under the proper compression by a nut 55 mounted upon the threaded end of the stem 49.

From the construction of the piston or sliding valve and its chamber in the body provided with ribs, it will be noted that a very small movement of the valve is necessary to remove it from its valve seat to form a communication between the ports or passageways 23 and 39 through the valve chamber 19, and such construction makes it unnecessary for the valve to move a distance equal to the diameter of the passageway 23 before opening the ports to their maximum capacity.

In practice when it is desired to apply the brakes the engineer's brake valve 4 is set at the proper position, so that the air in the train pipe or train line 5 is reduced, and such reduction causes the triple valves 7 and 10 to actuate, so that the air in the auxiliary reservoirs 8 and 11 will pass to the brake cylinders and apply the brakes, and the air in these brake cylinders after a short time will escape to the atmosphere, permitting the brakes to be released.

The safety application valve described above is particularly designed for use in air brakes of the present day construction in which the air pressure in the main reservoir is greater than that carried in the train pipe, as for instance, in high speed locomotives, the main reservoir pressure is 130 pounds while the pipe line pressure is but 110 pounds.

When the air pressure in the train line pipe is reduced to a predetermined amount, the air pressure upon the outer face of the equalizing pressure piston 48 is sufficiently reduced so that the air pressure upon the valve head of the piston or sliding valve from the main reservoir overbalances the said air pressure upon the equalizing pressure piston, causing the slide valve to be removed from its seat, thereby permitting the air in the main reservoir to pass into the valve chamber 19 through the port 39, and then out of the port 23 to the brake cylinders, thus replenishing the air which may have leaked from said brake cylinders.

By the use of my improved safety application valve a constant pressure is maintained in the brake cylinders from the main reservoir should the air pressure in the train pipe have been reduced to a predetermined amount and sufficient to permit the application of the brakes until the brakes are released, and the train line pressure restored to its usual amount. When the brakes are released the air flows from the main reservoir through the engineer's brake valve, increasing the air pressure in the train line pipes and the action of this air pressure upon the pressure equalizing piston 48 forces the same inward, thereby causing the inner end of its stem 49 to engage one end of the piston or sliding valve and force said piston or sliding valve toward the cylinder cap 47, until the same engages the valve seat 40, and as soon as such engagement takes place the air pressure from the main reservoir to the brake cylinders is shut off. As soon as the piston or sliding valve has seated, the triple valve is forced into the release position and allows the air from the brake cylinders to escape to the atmosphere, thereby releasing the brakes.

It is well known that the air pressure in the brake cylinders and auxiliary reservoirs will leak away after the brakes have been applied and release said brakes. It very often happens that the engine or locomotive moves or drifts at an undesirable and unexpected time and at a time when the auxiliary reservoirs are not charged, or do not contain the necessary pressure of air to properly actuate the brakes, and it is a well known fact that there is no way of applying the brakes unless the auxiliary reservoir is properly charged, said charging taking a considerable length of time and during this time the brakes must be released, that is the engineer's brake valve must be in the released position, but with the use of my improved safety application valve, when the train line pressure is reduced below a predetermined point, as for instance when the reduction is made during the application of the brakes, said valve will be opened by the pressure of air from the main reservoir and then should the air pressure leak off from the brake cylinders and auxiliary reservoirs, the air in the main reservoir may pass to either or both the auxiliary reservoirs and brake cylinders.

Under these conditions the air passes directly to the brake cylinders but in the case of the auxiliary reservoirs it must pass through the triple valve; and because of the reduction of the pressure in the auxiliary reservoir the triple valve will have been moved to the release position.

As soon as the air from the main reservoir enters the triple valve it will lift the slide valve from its seat, because of the higher pressure, and pass around the slide valve to one end thereof and force the same to application position, closing the exhaust which will permit the free passage of the air from the main reservoir to the auxiliary reservoir.

If at any time the auxiliary reservoir contains air at a pressure too low to operate the brakes and there is not time to permit the recharging of said auxiliary reservoir before the brakes must be applied, the air pressure in the train line is reduced sufficiently to permit the operation of my safety application valve, as above stated, which will cause the air from the main reservoir to pass directly into the brake cylinders and will force the triple valve to application position, as hereinbefore stated, and permit the air to enter the auxiliary reservoir, thereby permitting the use of the air from the main reservoir in an emergency application, whereby the brakes may be actuated without having to wait for the auxiliary reservoir to be recharged, and then flow from said auxiliary reservoir to the brake cylinders.

Of course I do not wish to be limited to the exact details of construction as herein shown, as these may be varied within the limits of the appended claims without departing from the spirit of my invention.

Having thus fully described my invention, what I claim as new and useful, is—

1. A valve comprising a housing or body having a central bore therethrough of two different diameters, the larger diameter forming a valve chamber and having a port leading therefrom, a member mounted on one end of said housing having a port therein and provided with a valve seat, longitudinal ribs formed integral with the housing and projecting into the valve chamber, a bushing mounted in the smaller diameter of the central bore, a piston or slide valve having a head and stem, said head being spaced from the walls of the valve chamber by the longitudinal ribs and adapted to engage the valve seat for shutting off the communication between the two ports, the stem of said valve adapted to slide in the bushing, and packings for said valve.

2. A valve comprising a housing or body having a central bore therethrough of two different diameters, the larger diameter forming a valve chamber and having a port leading therefrom, a member mounted on one end of said housing having a port therein and provided with a valve seat, longitudinal ribs formed integral with the housing and projecting into the valve chamber, a bushing mounted in the smaller diameter of the central bore, a piston or slide valve having a head and stem, said head being spaced from the walls of the valve chamber by the longitudinal ribs and adapted to engage the valve seat for shutting off the communication between the two ports, the stem of said valve adapted to slide in the bushing, packings for said valve, a pressure equalizing piston chamber carried by the body, a partition in said casing having a hole therethrough, an equalizing piston mounted in said casing, and a stem carried by said piston and projecting through the hole in the partition for engaging one end of the piston or slide valve to cause the latter to contact with its seat when pressure is applied to the outer face of the equalizing pressure piston.

3. In a fluid pressure brake the combination of a main reservoir, a plurality of auxiliary reservoirs, a plurality of brake cylinders, a train pipe and triple valve located between the train pipe and each auxiliary reservoir and brake cylinder and means controlled by the train pipe pressure whereby a reduction of pressure in the train pipe below a predetermined point will form a direct communication between the main reservoir and the brake cylinders and between the main reservoir and the auxiliary reservoirs through triple valves so that said brake cylinders and auxiliary reservoirs may be supplied with fluid to make up for any loss due to leakage.

4. In an air brake system, a main reservoir adapted to hold air at a high pressure, a train pipe adapted to carry air at a lower pressure than that in the main reservoir, brake cylinders, an auxiliary reservoir for each set of brake cylinders, a triple valve located between the train pipe and each set of brake cylinders and a valve controlled by the pressure in the train pipe, whereby a reduction of pressure in said train pipe will form a communication between the main reservoir and brake cylinders and between the main reservoir and the auxiliary reservoirs through the triple valve and the fluid from the main reservoir lifting the slide valve of each triple valve off its seat thereby closing the exhaust and permitting the fluid to pass into the auxiliary reservoirs.

In testimony whereof, I have hereunto affixed my signature in the presence of two subscribing witnesses.

JAMES G. SMELTZER.

Witnesses:
T. FOSTER THOMAS,
W. TOBIAS.

Copies of this patent may be obtained for five cents each, by addressing the "Commissioner of Patents, Washington, D. C."